(12) United States Patent
Bellezza Quater et al.

(10) Patent No.: US 6,626,712 B1
(45) Date of Patent: Sep. 30, 2003

(54) AMPHIBIOUS VEHICLE FOR CIVIL PROTECTION APPLICATIONS, DERIVED FROM TRACKED VEHICLES

(75) Inventors: Giorgio Bellezza Quater, Lombardore (IT); Paolo Bellezza Quater, S. Maurizio Canavese (IT); Silvia Bellezza Quater, S. Maurizio Canavese (IT)

(73) Assignee: A.R.I.S. S.p.A., Lombardore (IT)

( * ) Notice: Subject to any disclaimer, the term of this patent is extended or adjusted under 35 U.S.C. 154(b) by 0 days.

(21) Appl. No.: 09/807,886

(22) PCT Filed: Jun. 7, 2000

(86) PCT No.: PCT/EP00/05253

§ 371 (c)(1),
(2), (4) Date: Nov. 13, 2001

(87) PCT Pub. No.: WO00/74960

PCT Pub. Date: Dec. 14, 2000

(30) Foreign Application Priority Data

Jun. 8, 1999 (IT) .......................................... TO99A0481

(51) Int. Cl.[7] ................................................ B60F 3/00
(52) U.S. Cl. ............................... 440/12.56; 440/12.51; 440/12.63
(58) Field of Search ....................... 440/12.5, 12.51, 440/12.56, 12.63; 180/182, 184, 185, 190, 6.7, 7.4

(56) References Cited

U.S. PATENT DOCUMENTS

| | | | | |
|---|---|---|---|---|
| 2,068,664 A | * | 1/1937 | Dorst ........................ | 440/12.5 |
| 2,941,494 A | * | 6/1960 | McBride ..................... | 115/1 |
| 3,188,996 A | * | 6/1965 | Thompson .................. | 180/307 |
| 3,261,263 A | * | 7/1966 | Hilfing et al. .............. | 89/36.08 |
| 3,351,147 A | * | 11/1967 | Williamson ................. | 180/6.3 |
| 3,385,255 A | * | 5/1968 | Raymond et al. ............... | 115/1 |
| 3,395,672 A | | 8/1968 | Ruf | |
| 4,328,601 A | * | 5/1982 | Rodler, Jr. et al. .......... | 114/353 |
| 5,113,779 A | * | 5/1992 | Amrein et al. ........... | 440/12.63 |
| 5,993,273 A | * | 11/1999 | Adams ........................ | 440/5 |
| 6,116,972 A | * | 9/2000 | Bellezza Quater et al. ....... | 440/12.51 |
| 2002/0022415 A1 | * | 2/2002 | Choi et al. ................... | 440/12.5 |

FOREIGN PATENT DOCUMENTS

| | | | | |
|---|---|---|---|---|
| EP | 0 872 366 | | 10/1998 | |
| EP | 0872366 | * | 10/1998 | ............... 440/12.5 |
| EP | 0 974 474 | | 1/2000 | |
| EP | 0970824 A3 | * | 12/2000 | ............... 440/12.5 |
| FR | 2 411 095 | | 7/1979 | |
| GB | 2099113 | * | 12/1982 | ............. 440/12.51 |
| WO | 00/74960 A1 | * | 12/2000 | ............. 440/12.51 |

* cited by examiner

*Primary Examiner*—S. Joseph Morano
*Assistant Examiner*—Ajay Vasudeva
(74) *Attorney, Agent, or Firm*—Guido Modiano; Albert Josif; Daniel O'Byrne

(57) ABSTRACT

An amphibious vehicle comprising: a chassis (10), which has a hull-like structure and comprises supporting wheels (11) and driving wheels (13–14) for tracks (12) of the rubber-clad type, a fore buoyancy reserve (21) and an aft buoyancy reserve (22) which are obtained by means of a corresponding fore element (21') and aft element (22') which are permanently applied by means of watertight welds (CS) to the chassis. A power plant (MP) comprises an internal-combustion engine and two hydraulic pumps (41'–41") which, by virtue of corresponding delivery circuits (42'–42"), feed first hydraulic motors (44'–44") for simultaneous or selective driving of tracks for propulsion and steering on land and second hydraulic motors (45'–45") for simultaneous or selective rotation of hydrodynamic propulsion and steering propellers.

13 Claims, 5 Drawing Sheets

AMPHIBIOUS VEHICLE FOR CIVIL PROTECTION APPLICATIONS, DERIVED FROM TRACKED VEHICLES

BACKGROUND OF THE INVENTION

The present invention relates to an amphibious vehicle for civil protection applications and more specifically to a vehicle derived from known multipurpose tracked vehicles of the M113, M548 types and the like.

This type of multipurpose vehicle, conceived for military use and mainly for troop transport, has a hull-like structure having watertight characteristics which make it suitable to ford watercourses by resting on the underlying bed and also to give it limited amphibious capabilities which also make it suitable to cross small bodies of water and/or to travel over swampy terrain but always in calm and shallow water.

These limited amphibious capabilities of the original vehicle, however, make it unsuitable for civil protection applications, which require vehicles capable of travelling with equal ease, maneuverability and transport capacity both in water and on the ground and more specifically even in rough water, such as floodwaters of rivers and on rough terrain, for example in the presence of rubble from collapsed buildings and the like.

Clearly, such functional capabilities, which are indispensable in vehicles for civil protection applications, entail not only the ability of said vehicle to float, but also the presence of considerable onboard power and of means for wholly or partially transferring said power to land and/or hydrodynamic propulsion elements, optionally splitting the power and distributing it, in a percentage which can vary according to the situations, to both propulsion elements.

SUMMARY OF THE INVENTION

The aim of the present invention is to provide a vehicle for civil protection applications which is derived from a multipurpose vehicle such as M113 and the like and is designed essentially for evacuation of people transport of the injured and similar applications. The above aim is achieved, according to the invention, by adding to the original M113 vehicle fore and aft buoyancy reserves which are obtained by means of corresponding elements which define watertight cavities and are permanently applied, by watertight welding, to the hull-like chassis of said original vehicle and at least one power plant which comprises an internal-combustion engine with two or more hydraulic pumps which, by means of corresponding delivery circuits including respective throttling distribution elements, feed corresponding first hydraulic motors for the simultaneous or selective driving of tracks for propulsion and steering on land and/or corresponding second hydraulic motors for the simultaneous or selective rotation of hydrodynamic propulsion and steering propellers.

BRIEF DESCRIPTION OF THE DRAWINGS

Further characteristics and advantages of the amphibious vehicle according to the invention will become better apparent from the following detailed description and with reference to the accompanying exemplifying drawings, which are given by way of non-limitative example and in which.

DESCRIPTION OF THE PREFERRED EMBODIMENTS

Figure 1A:
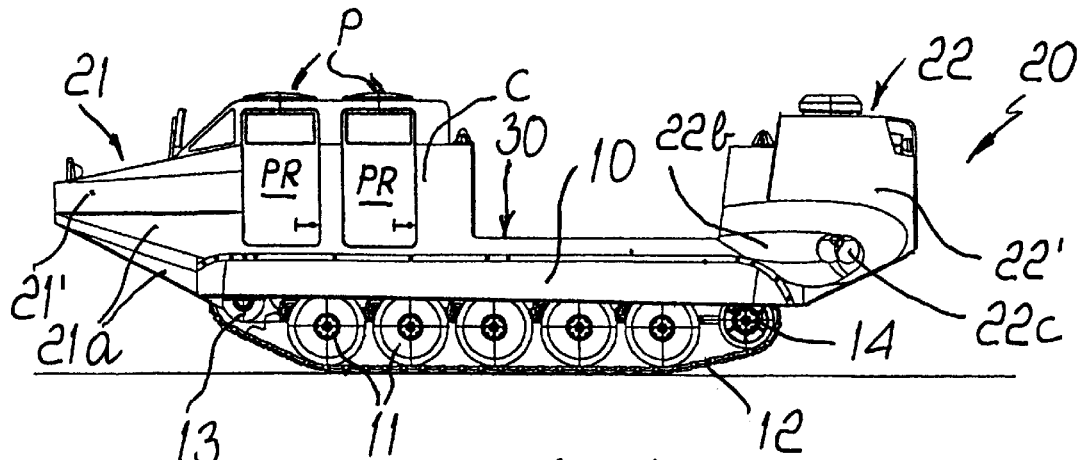
FIGS. 1a, 1b, 1c, 1d are, respectively, a side elevation view, a top plan view, a front elevation view and a rear elevation view of the amphibious vehicle according to a first embodiment of the invention.
Figure 1B:
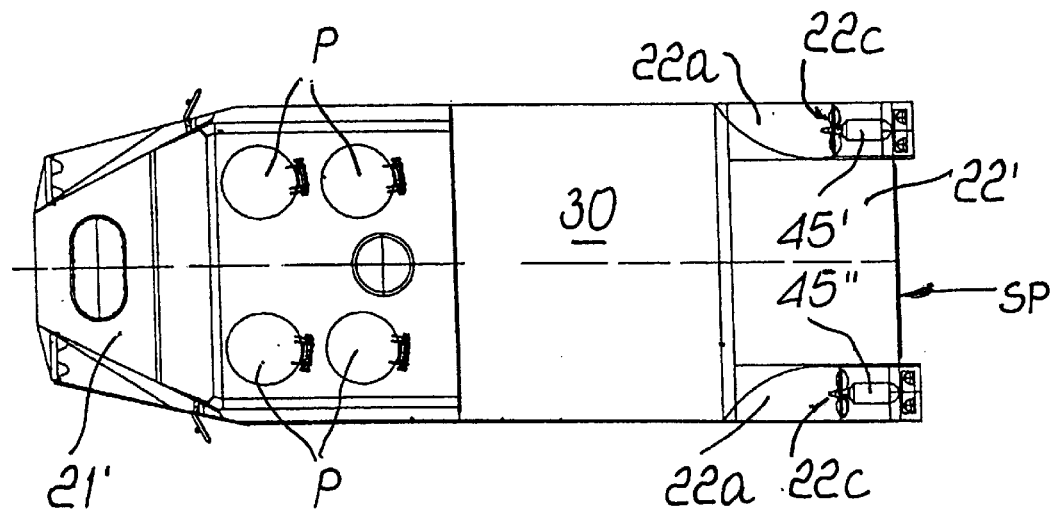
Figures 1C, 1D:
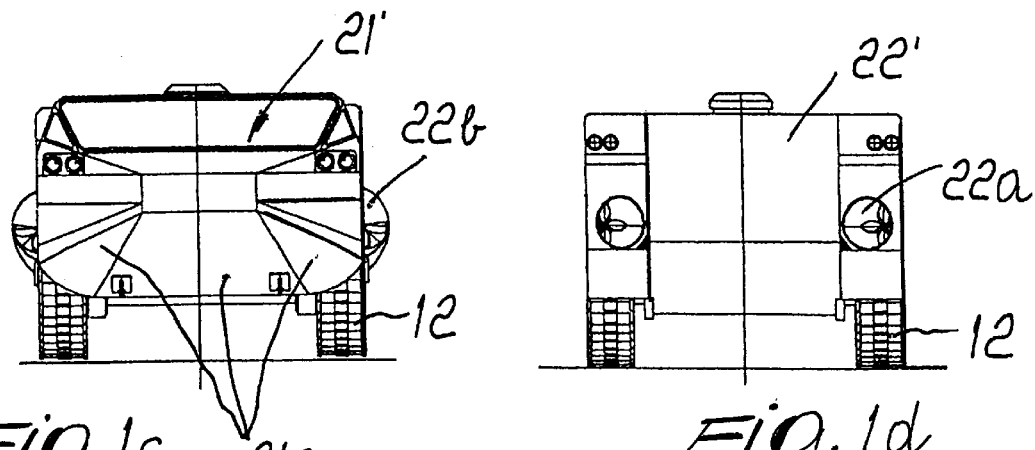
Figure 2A:
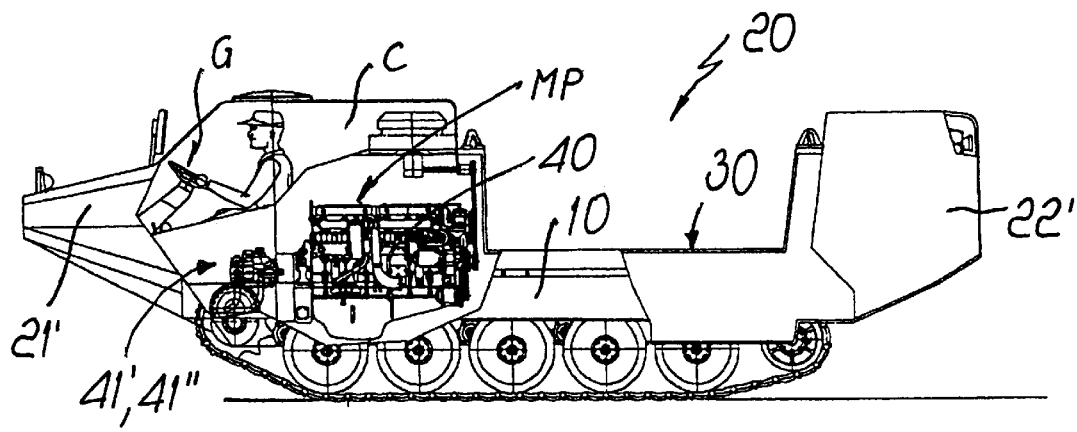
FIGS. 2a, 2b, 2c are partially sectional elevation and plan views of the vehicle of FIG. 1.
Figure 2B:
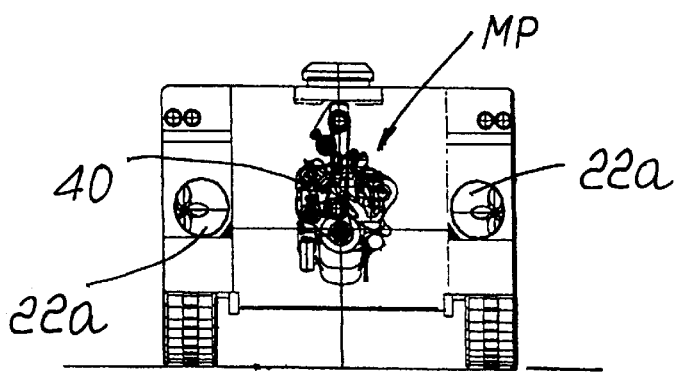
Figure 2C:
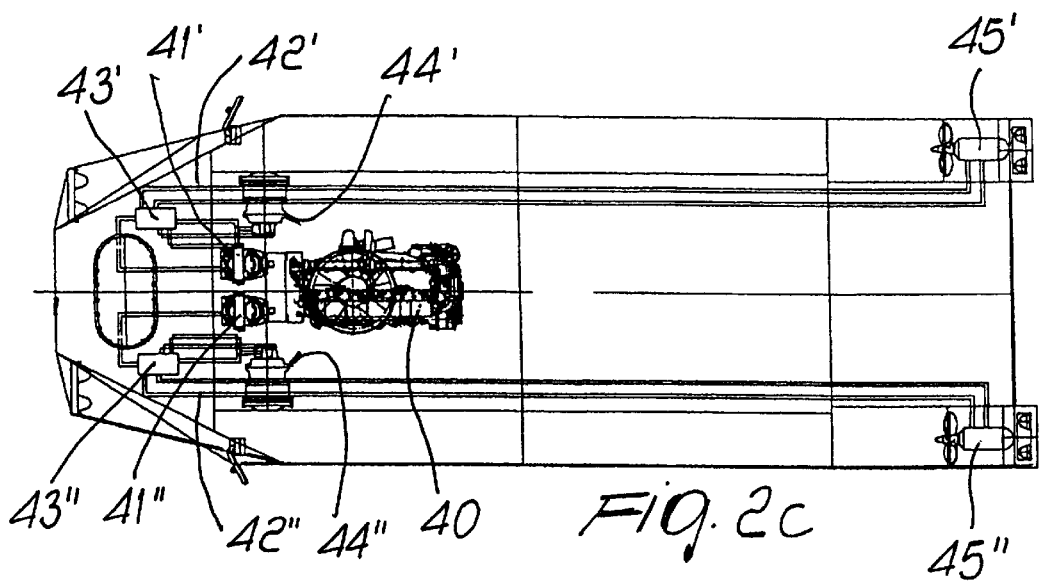
Figure 3A:
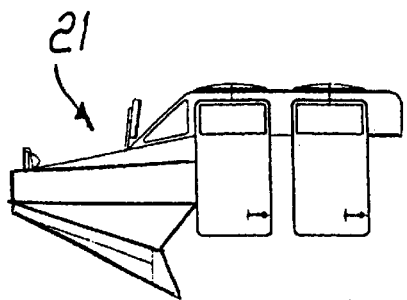
FIGS. 3a, 3b, 3c are, respectively, elevation views of the fore and aft buoyancy reserves of the vehicle of FIGS. 1 and 2.
Figure 3B:
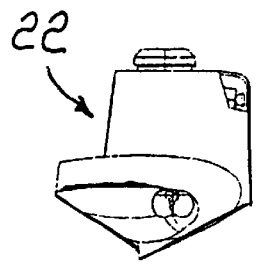
Figure 3D:
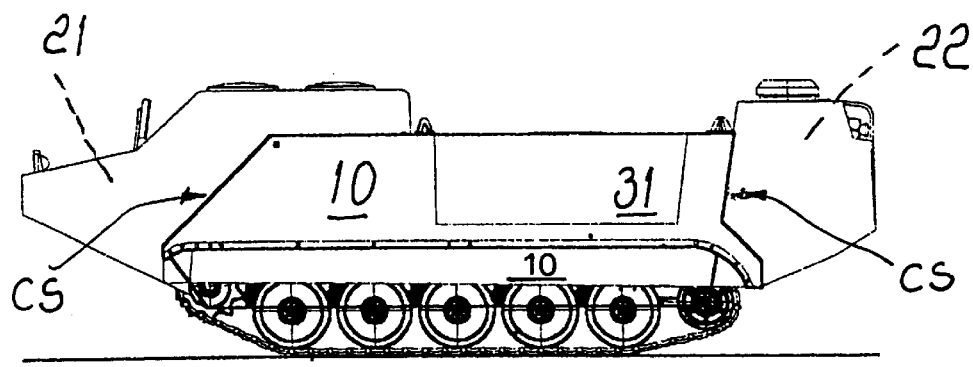
FIG. 3d is a view of the arrangement of the buoyancy reserves of FIGS. 3a, 3b and 3c on the chassis of the original vehicle.
Figure 3C:
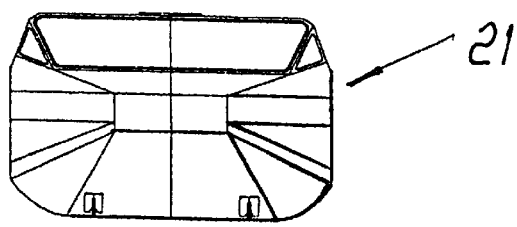

With reference to FIGS. 1 to 3, 10 generally designates the base chassis of an original vehicle for example of the type known as M113 or the like, from which the vehicle 20 according to the invention, intended for civil protection applications, is derived (FIG. 1a).

The chassis 10 of the vehicle (FIG. 3d) has a watertight hull-like structure and is provided with sets of wheels 11 for the resting and guiding of respective tracks 12 of the rubber-clad type, each of which is driven by a driving sprocket 13 and is guided by a freely rotating sprocket 14.

The vehicle 20 according to the invention is obtained starting from the chassis 10, whereto a fore buoyancy reserve 21 and an aft buoyancy reserve 22 are added; such buoyancy reserves are obtained by means of corresponding fore and aft elements 21'–22' made of metal plate, which are preferably filled with foamed material and are applied to the chassis 10 by watertight welding.

The fore element 21' has submerged surfaces 21a which have a buoyancy-generating hydrodynamic profile which during navigation can produce a hydrodynamic positive buoyancy equal to 15–20% of the total hydrostatic buoyancy.

The aft element 22' is instead provided with two ducted seats 22a having hydrodynamic intakes 22b for containing corresponding ducted propellers 22c which are located to the rear on the two sides of the vehicle.

The fore element 21' further delimits a covered cabin C which has hatches P and doors PR, and has at least one row of transverse seats for transporting people; laterally to said row there is a driver's seat G, and said fore element accommodates, in its rear and central part, a power plant which is generally designated by MP and is insulated from the inside of the cabin by means of a soundproofed housing (not shown).

As clearly shown in FIGS. 3a–d, the fore element 21' and the aft element 22' are permanently connected to the chassis 10 by means of welding beads whose outline is designated by CS. A loading platform 30 is delimited between the two fore and aft elements and can be provided with tilt-down sides 31 and/or can be equipped with several rows of transverse and/or longitudinal benches (not shown).

The power plant MP comprises an internal-combustion engine 40, preferably of the Diesel type, and two hydraulic pumps 41'–41" which are operatively coupled to the motor 40. The pumps 41 are connected to corresponding delivery circuits 42'–42", which comprise respective distribution/throttling elements 43'–43", and the delivery circuits supply first hydraulic motors 44'–44" for driving simultaneously, or selectively for steering, the driving sprockets 13 that actuate the tracks 12 and second hydraulic motors 45'–45" for driving simultaneously, or selectively for steering, the propellers 22c. The throttling/distribution elements 43 are provided in order to vary the percentage of power that is sent to the motors 44 and 45 depending on the operating requirements and to steer the vehicle 20 both on the ground and in the water, bypassing or throttling the motors arranged on one side with respect to the motors located on the other side of the vehicle.

Figure 4A:
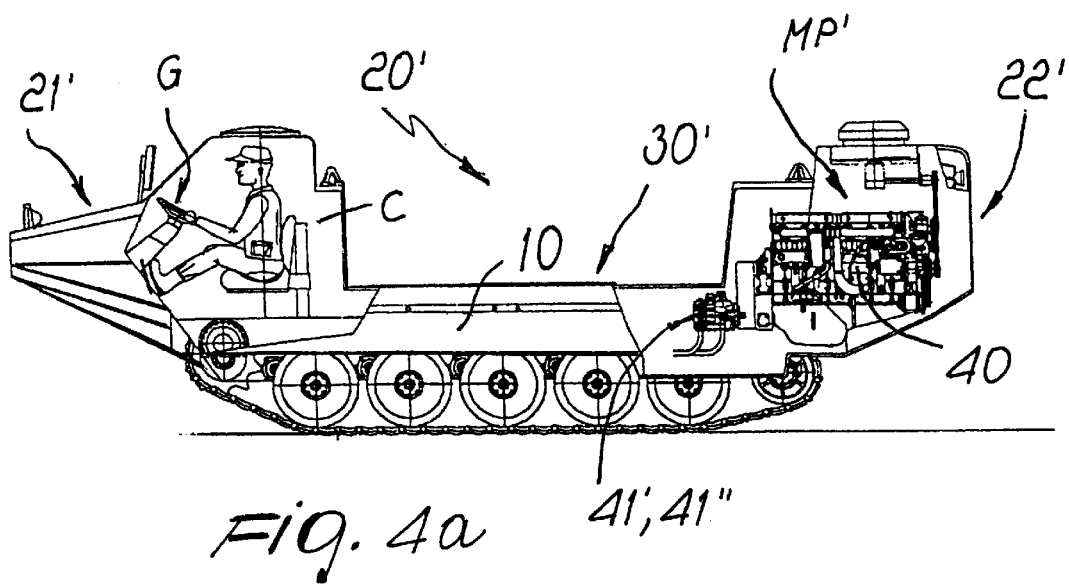
FIGS. 4a, 4b, 4c are views, similar to the corresponding FIGS. 2a, 2b, 2c, of a second embodiment of the amphibious vehicle according to the invention.
Figure 4B:
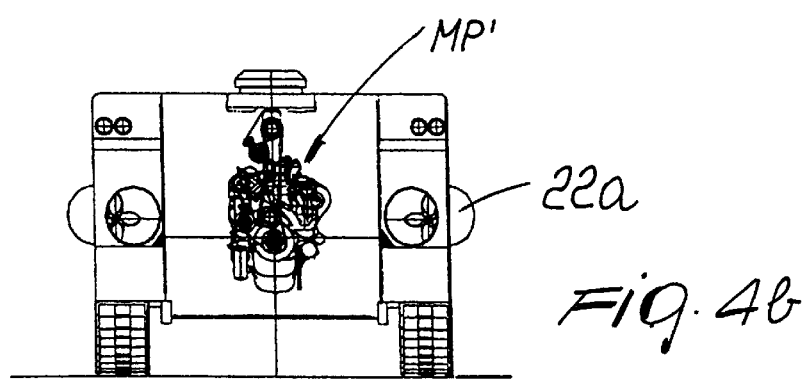
Figure 4C:
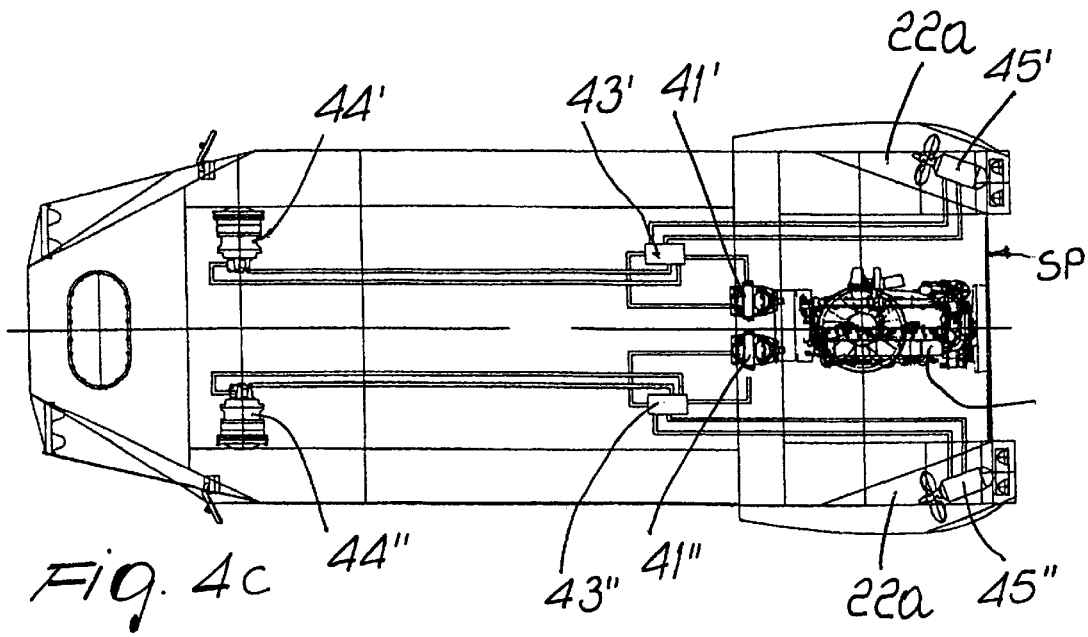

The embodiment of FIGS. 4a–4b–4c differs exclusively in the arrangement of the power plant MP', which is again arranged on the longitudinal axis of the vehicle 20' but at the back rather than the front. In this case, the cabin C is shortened and since the power plant is contained mostly inside the aft element 22', a larger loading platform 30' is delimited between the cabin C and the aft element, improving the loading capacity of the vehicle 20'. In turn, the aft element is provided with tubular seats 22a for the ducted propellers 22c, whose axes converge in a point which lies outside the transom SP.

Figure 5A:
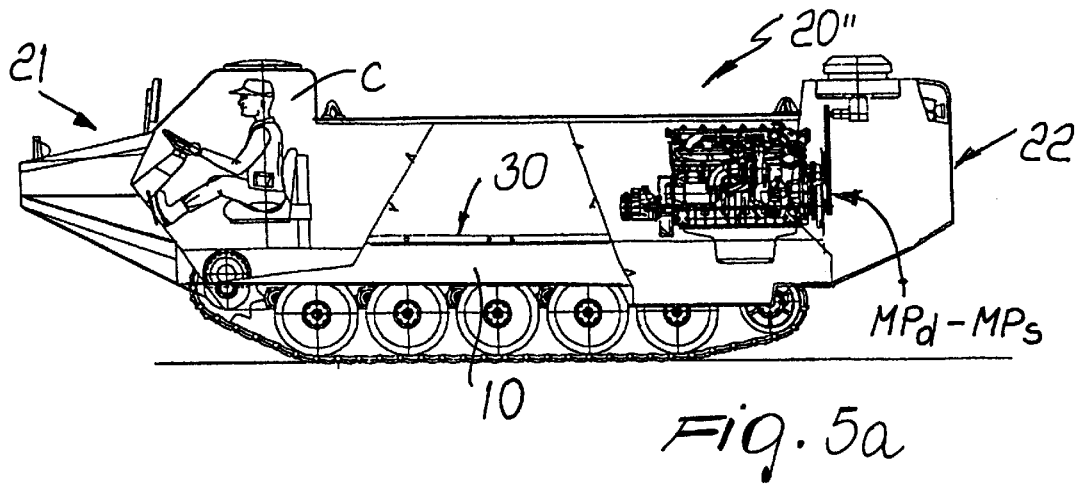
FIGS. 5a, 5b, 5c are views, similar to the preceding FIG. 4, of third embodiment of the amphibious vehicle according to the invention.
Figure 5B:
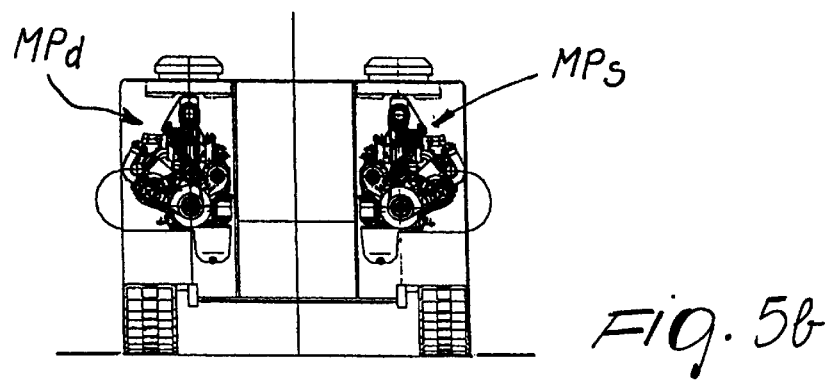
Figure 5C:
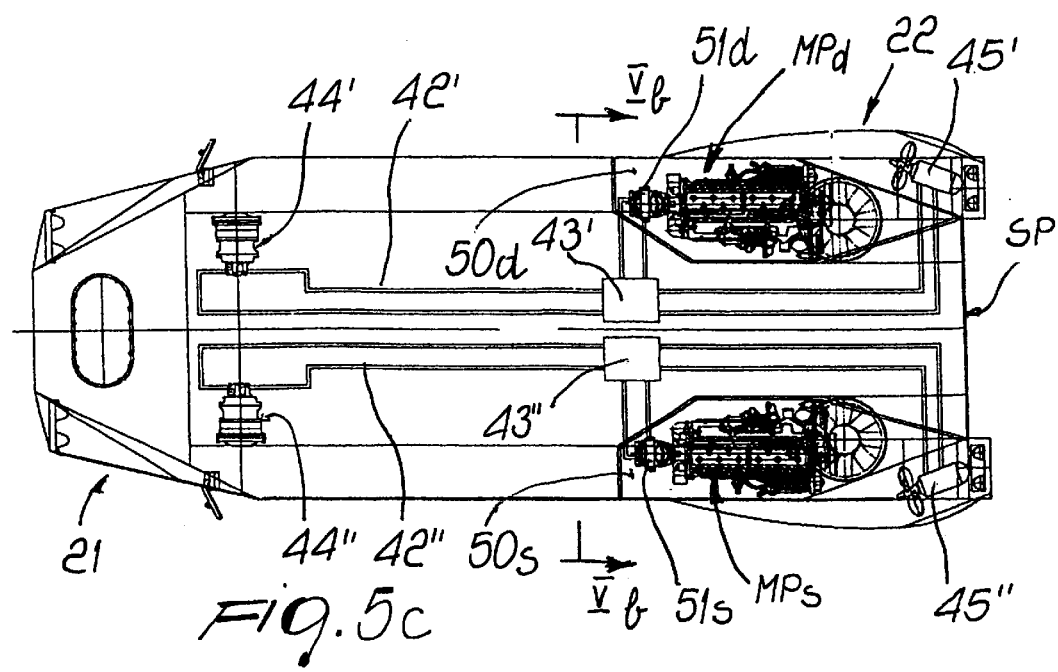

In the embodiment of FIGS. 5a–b–c, the amphibious vehicle 20" is provided with two rear power plants MPd-MPs which are arranged at the respective left and right sides of the vehicle and are accommodated in respective containment compartments 50d–50s delimited by corresponding bulkheads which extend toward the aft element 22', which also has seats 22a for the ducted propellers 22c having converging axes. Each motor drives a corresponding hydraulic pump 51d–51s and the pumps, by means of their own delivery circuits provided with distribution/throttling elements 53d–53s, feed the first motors 44'–44" for driving the tracks and the second motors 45'–45" for driving the propellers.

Without altering the concept of the invention, the details of execution and the embodiments may of course be varied extensively with respect to what has been described and illustrated by way of non-limitative example, without thereby abandoning the scope of the appended claims.

The disclosures in Italian Patent Application No. TO99A000481 from which this application claims priority are incorporated herein by reference.

What is claimed is:

1. An amphibious vehicle for civil protection applications, derived from tracked vehicles, comprising:
   a hull-shaped chassis with supporting and driving wheels for tracks of the rubber-clad type;
   fore and aft buoyancy reserves, provided by way of corresponding fore and aft elements which are permanently fastened to the chassis by means of watertight welds;
   a pair of ducted seats provided with hydrodynamic intakes and arranged each on a respective side of the vehicle and at the rear side thereof;
   two hydrodynamic propulsion and steering propellers, arranged in said ducted seats; and
   at least one power plant comprising an internal-combustion engine, two hydraulic pumps, delivery circuits and first and second hydraulic motors, said hydraulic pumps feeding by way of corresponding ones of said delivery circuits, said first hydraulic motors for simultaneous or selective driving of tracks for propulsion and steering on land, and said second hydraulic motors for simultaneous or selective rotation of the hydrodynamic propulsion and steering propellers.

2. The amphibious vehicle according to claim 1, wherein said fore element and aft element are made of metal plate and comprise respective watertight cavities filled with foamed material.

3. The amphibious vehicle according to claim 1, wherein said fore element is provided with immersed surfaces which have a buoyancy-generating hydrodynamic profile.

4. The amphibious vehicle according to claim 1, further comprising a covered cabin provided with hatches and doors, located at said fore element and having at least one row of transverse seats for transporting people which is flanked by a driver's seat, and accommodating said power plant in its rear and central part.

5. The amphibious vehicle according to claim 1, comprising a loading platform which is interposed between said fore and aft elements.

6. The amphibious vehicle according to claim 5, wherein said loading platform is provided with tilt-down sides.

7. The amphibious vehicle according to claim 5, wherein said loading platform is provided with several rows of transverse and/or longitudinal benches.

8. The amphibious vehicle according to claim 1, wherein said delivery circuits comprise respective distribution/throttling elements that vary, according to the operating requirements and in order to steer the vehicle, the percentage of power that is delivered to said first and second motors through bypassing/throttling of first and second motors arranged on one side of the vehicle with respect to first and second motors arranged on the other side of the vehicle.

9. The amphibious vehicle according to claim 1, wherein said power plant is arranged on the longitudinal axis of the vehicle, at a rear side thereof.

10. The amphibious vehicle according to claim 1, comprising two rear power plants which are arranged at the respective right and left sides of the vehicle, hydraulic pumps and delivery circuits, each said motor driving corresponding hydraulic pumps which feed, by way of said delivery circuits, said first motors for driving the tracks and said second motors for driving the propellers.

11. An amphibious vehicle for civil protection applications, derived from tracked vehicles, comprising:
   a hull-shaped chassis with supporting and driving wheels for tracks of the rubber-clad type;
   fore and aft buoyancy reserves, provided by way of corresponding fore and aft elements which are permanently fastened to the chassis by means of watertight welds, said fore element being provided with immersion surfaces which have a buoyancy generating hydrodynamic profile;
   two hydrodynamic propulsion and steering propellers; and
   at least one power plant comprising an internal-combustion engine, two hydraulic pumps, delivery circuits, and first and second hydraulic motors, said internal-combustion engine and hydraulic pumps being operatively connected, by way of corresponding ones of said delivery circuits, to said first hydraulic motors for simultaneous or selective driving of tracks for propulsion and steering on land, and to said second hydraulic motors for simultaneous or selective rotation of the hydrodynamic propulsion and steering propellers.

12. The amphibious vehicle according to claim 11, wherein the aft element is provided with a pair of ducted seats provided with hydrodynamic intakes that contain corresponding ducted propellers arranged to the rear of, and on the two sides of, the vehicle.

13. An amphibious vehicle for civil protection applications, derived from tracked vehicles, comprising:
   a hull-shaped chassis with supporting and driving wheels for tracks of the rubber-clad type;
   fore and aft buoyancy reserves, provided by way of corresponding fore and aft elements which are permanently fastened to the chassis by means of watertight welds, said fore element being provided with immersion surfaces which have a buoyancy generating hydrodynamic profile;

two hydrodynamic propulsion and steering propellers; and a power plant, arranged on a longitudinal axis of the vehicle and comprising an internal-combustion engine, two hydraulic pumps, delivery circuits, and first and second hydraulic motors, said internal-combustion engine and hydraulic pumps being operatively connected, by way of corresponding ones of said delivery circuits, to said first hydraulic motors for simultaneous or selective driving of tracks for propulsion and steering on land, and to said second hydraulic motors for simultaneous or selective rotation of the hydrodynamic propulsion and steering propellers.

* * * * *